(12) United States Patent
Forbes et al.

(10) Patent No.: US 6,775,538 B2
(45) Date of Patent: Aug. 10, 2004

(54) HANDLING OF DIALLED DIGITS IN A WIRELESS TELECOMMUNICATIONS SYSTEM

(75) Inventors: Nicholas John David Forbes, Thatcham (GB); Richard Mortimer Lamkin, Godalming (GB)

(73) Assignee: Airspan Networks, Inc., Seattle, WA (US)

( * ) Notice: Subject to any disclaimer, the term of this patent is extended or adjusted under 35 U.S.C. 154(b) by 576 days.

(21) Appl. No.: 09/802,238

(22) Filed: Mar. 8, 2001

(65) Prior Publication Data

US 2002/0025800 A1 Feb. 28, 2002

(30) Foreign Application Priority Data

Aug. 24, 2000 (GB) .............................................. 0020955

(51) Int. Cl.⁷ .............................. H04M 3/42; H04M 1/00
(52) U.S. Cl. .................... 455/414.1; 455/464; 455/564; 379/355.01
(58) Field of Search .............................. 455/414.1, 417, 455/422.1, 557, 401, 564, 460, 403, 464; 379/355.01, 355.02, 350

(56) References Cited

U.S. PATENT DOCUMENTS 5,724,656 A * 3/1998 Vo et al. .................. 455/422.1
2002/0065063 A1 * 5/2002 Uhlik et al. ................ 455/404

FOREIGN PATENT DOCUMENTS

WO WO 9713381 4/1997
WO WO 9957921 A1 * 11/1999 ............ H04Q/7/20

* cited by examiner

Primary Examiner—Fan Tsang
Assistant Examiner—Ovidio Escalante
(74) Attorney, Agent, or Firm—Mark A. Haynes; Haynes Beffel & Wolfeld LLP

(57) ABSTRACT

The present invention provides a digit handling system and digit handling method for a subscriber terminal of a wireless telecommunications system, the subscriber terminal being arranged to have an item of telecommunications equipment connected thereto and being connectable to a central terminal of the wireless telecommunications system via a radio resource to enable a call to be routed between the item of telecommunications equipment and an exchange coupled to the central terminal. The digit handling system comprises a detector for detecting when the item of telecommunications equipment enters an off-hook state, a dial tone generator for generating a fake dial tone to the item of telecommunications equipment upon detection of the off-hook state, and a radio manager, responsive to detection of the off-hook state, for seeking acquisition of a communication channel of the radio resource over which to pass call data. Further, a switching element is provided for controlling the routing of digits through the subscriber terminal, the switching element being arranged to pass to a storage digits received from the item of telecommunications equipment following the detection of the off-hook state. A digit regenerator is then responsive to an indication that the communication channel has been acquired, to regenerate each digit stored in the storage and to output the regenerated digits over the radio resource to the central terminal. The switching element is arranged, upon determination that the storage contains no further digits, to route any further digits received from the item of telecommunications equipment for output over the radio resource to the central terminal without being stored in the storage. This approach provides a particularly efficient technique for the handling of digits generated by the item of telecommunications equipment following that equipment entering an off-hook state.

12 Claims, 8 Drawing Sheets

HANDLING OF DIALLED DIGITS IN A WIRELESS TELECOMMUNICATIONS SYSTEM

BACKGROUND OF THE INVENTION

1. Field of the Invention

The present invention relates generally to the handling of dialled digits in a wireless telecommunications system, and more particularly to a digit handling system and method for a subscriber terminal of a wireless telecommunications system.

2. Description of the Prior Art

In a typical wireless telecommunications system, a subscriber terminal (ST) may be located at a subscriber's premises for handling calls to and from that subscriber. One or more lines may be provided from the subscriber terminal for supporting one or more items of telecommunications equipment located at the subscriber's premises. Further, a central terminal may be provided for controlling a number of subscriber terminals, and in particular for managing calls between a subscriber terminal and other components of a wireless telecommunications network.

Each subscriber terminal communicates with the central terminal via a radio resource. In accordance with known techniques, multiple communication channels may be arranged to utilise the radio resource for the transmission of signals to and from the subscriber terminal. For example, in a "Code Division Multiple Access" (CDMA) system, a radio resource consisting of a particular frequency channel may be partitioned by applying different orthogonal codes to signals to be transmitted on that frequency channel. Signals to which an orthogonal code has been applied can be considered as being transmitted over a corresponding orthogonal communication channel utilising the particular frequency channel. Similarly, in a "Time Division Multiple Access" (TDMA) system, a radio resource consisting of a particular frequency channel can be partitioned in the time domain, such that a number of different signals can be transmitted in different time slots, the time slots forming multiple communication channels utilising the radio resource. As another example, in a "Frequency Division Multiple Access" (FDMA) system, a radio resource consisting of a band of frequencies may be partitioned to form a number of communication channels at particular frequencies, thereby enabling multiple signals to be transmitted over the radio resource.

It is desirable that the item of telecommunications equipment connected to a subscriber terminal is able to behave as though it were connected via a standard wired connection with an exchange (for example, a public switched telephone network (PSTN)), and in particular that the end user does not have to operate the item of telecommunications equipment any differently than he/she would operate the item of telecommunications equipment were it connected directly by a wired connection with the exchange.

In a typical wired system, if a user wishes to make an outgoing call, he/she would cause the item of telecommunications equipment to enter an off-hook state, for example by lifting the handset, the off-hook state would be detected by the exchange, and a real dial tone would then be provided from the exchange to the item of telecommunications equipment. Once the user receives the dial tone, he/she would then be able to enter dialled digits for the destination telephone number, and these would be routed straight through to the exchange.

In current versions of the above described wireless telecommunications system, a similar sequence of events occurs at the item of telecommunications equipment. Hence, when the item of telecommunications equipment enters an off-hook state, this will cause the wireless telecommunications system to establish a link to the exchange including the provision of a communication channel over the radio resource between the central terminal and the subscriber terminal. Once the link is established, the real dial tone is then generated by the exchange, and provided to the item of telecommunications equipment, whereafter the user can enter dialled digits in the usual manner, which are routed straight through to the exchange.

Whilst the above approach enables the item of telecommunications equipment to be operated in an identical manner to that in which it would be operated were the item of telecommunications equipment connected to a conventional wired link, there can be a detectable delay between the item of telecommunications equipment going off-hook and the user being provided with the real dial tone, due to the time taken to establish the link with the exchange via a communication channel of the radio resource. This issue is particularly a concern when the system is operated in a Demand Assignment mode, in which a larger number of STs are associated with the central terminal than the number of traffic-bearing communication channels available on the radio resource. In such a Demand Assignment mode, since a particular ST is not directly associated with a particular communication channel, it typically takes slightly longer to establish the wireless link, due to the extra step of determining an available communication channel over which to place a call.

Accordingly, it would be desirable to provide at technique for more efficiently establishing a call from an item of telecommunications equipment connected to a subscriber terminal, whilst still enabling the item of telecommunications equipment to be operated as though it were connected to a wired network.

SUMMARY OF THE INVENTION

Viewed from a first aspect, the present invention provides a digit handling system for a subscriber terminal of a wireless telecommunications system, the subscriber terminal being arranged to have an item of telecommunications equipment connected thereto and being connectable to a central terminal of the wireless telecommunications system via a radio resource to enable a call to be routed between the item of telecommunications equipment and an exchange coupled to the central terminal, the digit handling system comprising: a detector for detecting when the item of telecommunications equipment enters an off-hook state; a dial tone generator for generating a fake dial tone to the item of telecommunications equipment upon detection of the off-hook state; a radio manager, responsive to detection of the off-hook state, for seeking acquisition of a communication channel of the radio resource over which to pass call data; a switching element for controlling the routing of digits through the subscriber terminal, the switching element being arranged to pass to a storage digits received from the item of telecommunications equipment following the detection of the off-hook state; a digit regenerator, responsive to an indication that the communication channel has been acquired, for regenerating each digit stored in the storage and outputting the regenerated digits over the radio resource to the central terminal; the switching element being arranged, upon determination that the storage contains no further digits, to route any further digits received from the item of telecommunications equipment for output over the radio resource to the central terminal without being stored in the storage.

In accordance with the present invention, upon detection of the item of telecommunications equipment entering an off-hook state, a fake dial tone is provided to the item of telecommunications equipment whilst a radio manager seeks acquisition of a communication channel of the radio resource. Since a dial tone has been provided to the item of telecommunications equipment, the user is able to dial digits for the destination telephone number even though the actual link has not yet been established.

Since this approach enables a user to start dialling digits before the link has actually been established, a switching element is provided to pass to a storage any digits received from the item of telecommunications equipment following generation of the fake dial tone. This happens entirely transparently to the end user.

Once the communication channel has been acquired, a digit regenerator then regenerates each digit stored in the storage and outputs the regenerated digits over the radio resource to the central terminal, for forwarding on to the exchange. Whilst this digit regeneration is going on, any additional digits dialled by the user are also stored in the storage. However, at some point, it will be determined that the storage contains no further digits, because the digit regenerator has caught up with the digits already entered by the user, and at this point the switching element is arranged to route any further digits received from the item of telecommunications equipment for output over the radio resource to the central terminal without being stored in the storage.

By the above approach, the user's perception is that a link is established almost immediately, and accordingly the user can begin dialling the number without delay. The digit handling system is then able to temporarily buffer digits, and regenerate them once the link has been established, with the whole process being transparent to the end user. In addition to increasing the end user's perception as to the efficiency of the system, this approach can also improve efficiency in real terms, since the digits can typically be regenerated quicker than they are dialled by the user, and because the user can start dialling the digits earlier, the call will often actually be established more quickly than when the earlier described prior art approach is used.

In one embodiment of the invention, the digits are tone dialled digits, and the digit regenerator outputs the regenerated digits over the communication channel acquired by the radio manager with a predetermined delay between each regenerated digit. Hence, each regenerated digit is sent one digit at a time with a predetermined delay (also referred to as an inter-digit pause) between each digit, and this ensures that the digit stream is recreated as if the user had been dialling the regenerated digits directly.

As an alternative to tone dialled digits, the digits may be loop disconnect dialled digits, and in this event the digit regenerator regenerates each stored digit as a digit message and outputs each digit message over a signalling communication channel of the radio resource, with a predetermined delay between each digit message. Hence, any stored loop disconnect dialled digits are sent one digit at a time within a loop disconnect digit message over the radio to the central terminal, and then on to the interface between the wireless telecommunications system and the exchange. The interface will then regenerate the loop disconnect dialled digits towards the exchange; this may be over a message-based protocol (V5.1/V5.2) or CAS depending upon the exchange type. This is in contrast to the handling of tone dialled digits as mentioned earlier, which are regenerated in-band locally within the subscriber terminal.

It will be appreciated by those skilled in the art that the above approach also enables mixed dialling to be handled (e.g. loop disconnect digits followed by tone dialled digits or tone dialled digits followed by loop disconnect digits), and the final digits stream as received by the exchange will be as dialled by the user.

In addition to improving the general efficiency of the dialling process as discussed earlier, further benefits can be realised in accordance with preferred embodiments of the present invention. For example, in preferred embodiments of the present invention, the digit handling system further comprises a number comparator arranged to compare, as each digit is stored in the storage, the number represented by the stored digits with one or more selected numbers, and to issue a match signal to the radio manager if the stored digits match any of the selected numbers. Hence, in accordance with such embodiments of the present invention, the system is able to perform some initial processing based on the digits being buffered in the storage whilst the communication channel is being acquired. It will be appreciated that this initial processing may be used for a variety of purposes. For example, it may be used in determining certain call routing information based on the number being dialled including, for example, radio channel selection, or may be used in connection with call billing applications. However, in preferred embodiments of the present invention, the comparison is used to identify one or more priority numbers that are to be given preferential treatment with regards to the acquisition of a communication channel for calls to those numbers.

In preferred embodiments, upon receipt of the match signal issued by the number comparator, the radio manager is arranged to seek acquisition of a reserved communication channel for the call if the communication channel has not yet been acquired. More particularly, in preferred embodiments, the selected numbers are priority telephone numbers and the reserved communication channel is one of a number of priority channels reserved by the wireless telecommunications system for the handling of priority calls to said priority telephone numbers. Typically, the priority telephone numbers will be definable for each subscriber terminal, for each line of the subscriber terminal, or for a group of subscriber terminals, and may for example be set via a management system of the wireless telecommunications system.

Preferably, upon receipt of the match signal, if the communication channel has already been acquired, the radio manager is arranged to identify that that communication channel should be treated as a reserved communication channel for the duration of the call. Hence, if at the time the match is detected by the number comparator, a communication channel has already been acquired, then in preferred embodiments the radio manager does not seek acquisition of a reserved communication channel, but instead merely treats the communication channel that has already been acquired as a reserved communication channel for the duration of the call. Hence, as an example, the radio manager may identify that communication channel as a reserved communication channel whilst the call is active, to avoid that call being dropped by the wireless telecommunication system for any reason.

In preferred embodiments, the communication channel acquired by the radio manager comprises a downlink communication channel from the central terminal to the subscriber terminal and an uplink communication channel from the subscriber terminal to the central terminal, the switching element being able to independently control the connection of the item of telecommunication equipment to the downlink and uplink communication channels.

It will be appreciated by those skilled in the art that the decision as to when to connect the uplink and downlink communication channels can be controlled in a variety of ways, and preferably is configurable by the management system. For example, the digit regenerator may be arranged to be responsive to detection of a real dial tone signal from the exchange to begin regenerating digits, the exchange being arranged to turn off the real dial tone upon receipt of the first regenerated digit, the switching element being responsive to detection that the real dial tone has been turned off to connect the downlink communication channel to the item of telecommunications equipment. This enables any in-band tones generated by the exchange following turning off of the real dial tone to be passed through to the item of telecommunications equipment.

Further, in preferred embodiments, the switching element is arranged, once the last digit in the storage has been regenerated and the predetermined delay following output of that last digit has expired, to connect the uplink communication channel to the item of telecommunications equipment, after which the switching element is arranged to ensure that no further dialled digits are routed to the storage. Hence, once the digit regenerator has caught up with the digits being dialled by the user, the uplink communication channel is connected to the item of telecommunications equipment, so that any further digits can be handled in the standard manner.

Viewed from a second aspect, the present invention provides a subscriber terminal arranged to have an item of telecommunications equipment connected thereto and being connectable to a central terminal of the wireless telecommunications system via a radio resource to enable a call to be routed between the item of telecommunications equipment and an exchange coupled to the central terminal, the subscriber terminal comprising a digit handling system according to the first aspect of the present invention.

Viewed from a third aspect, the present invention provides a method of handling dialled digits in a subscriber terminal of a wireless telecommunications system, the subscriber terminal being arranged to have an item of telecommunications equipment connected thereto and being connectable to a central terminal of the wireless telecommunications system via a radio resource to enable a call to be routed between the item of telecommunications equipment and an exchange coupled to the central terminal, the method comprising the steps of: detecting when the item of telecommunications equipment enters an off-hook state; generating a fake dial tone to the item of telecommunications equipment upon detection of the off-hook state; responsive to detection of the off-hook state, seeking acquisition of a communication channel of the radio resource over which to pass call data; controlling a switching element to pass to a storage digits received from the item of telecommunications equipment following the detection of the off-hook state; responsive to an indication that the communication channel has been acquired, regenerating each digit stored in the storage and outputting the regenerated digits over the radio resource to the central terminal; upon determination that the storage contains no further digits, controlling the switching element to route any further digits received from the item of telecommunications equipment for output over the radio resource to the central terminal without being stored in the storage.

Viewed from a fourth aspect, the present invention provides a computer program operable to configure a subscriber terminal of a wireless telecommunications system to perform a method in accordance with the third aspect of the present invention. The present invention also relates to a carrier medium comprising such a computer program.

BRIEF DESCRIPTION OF THE DRAWINGS

The present invention will be described further, by way of example only, with reference to a preferred embodiment thereof as illustrated in the accompanying drawings, in which.

DESCRIPTION OF PREFERRED EMBODIMENTS

Before describing a preferred embodiment of the present invention, an example of such a wireless telecommunications system in which the present invention may be employed will first be discussed with reference to FIGS. 1 to 3.

Figure 1:
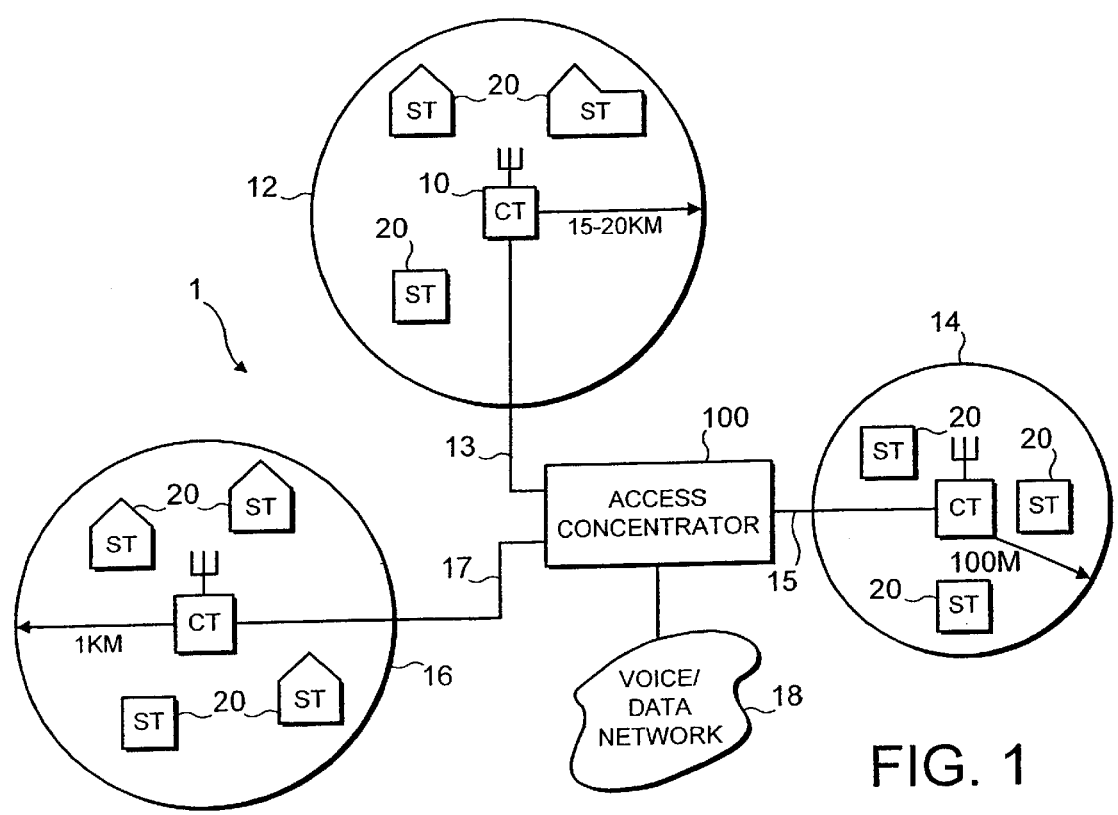
FIG. 1 is a schematic overview of an example of a wireless telecommunications system in which the present invention may be employed.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The wireless telecommunications system of FIG. 1 is based on providing radio links between subscriber terminals 20 at fixed locations within a service area (e.g., 12, 14, 16)

and the central terminal 10 for that service area. These wireless radio links are established over predetermined frequency channels, a frequency channel typically consisting of one frequency for uplink signals from a subscriber terminal to the central terminal, and another frequency for downlink signals from the central terminal to the subscriber terminal.

Due to bandwidth constraints, it is not practical for each individual subscriber terminal to have its own dedicated frequency channel for communicating with a central terminal. Hence, techniques have been developed to enable data items relating to different wireless links (i.e. different ST-CT communications) to be transmitted simultaneously on the same frequency channel without interfering with each other. One such technique involves the use of a "Code Division Multiple Access" (CDMA) technique whereby a set of orthogonal codes may be applied to the data to be transmitted on a particular frequency channel, data items relating to different wireless links being combined with different orthogonal codes from the set. Signals to which an orthogonal code has been applied can be considered as being transmitted over a corresponding orthogonal channel within a particular frequency channel.

One way of operating such a wireless telecommunications system is in a fixed assignment mode, where a particular ST is directly associated with a particular orthogonal channel of a particular frequency channel. Calls to and from items of telecommunications equipment connected to that ST will always be handled by that orthogonal channel on that particular frequency channel, the orthogonal channel always being available and dedicated to that particular ST. Each CT 10 can then be connected directly to the switch of a voice/data network 18, for example the switch of a public switched telephone network (PSTN). In the following description, a PSTN is referenced as an example of the voice/data network.

However, as the number of users of telecommunications networks increases, so there is an ever-increasing demand for such networks to be able to support more users. To increase the number of users that may be supported by a single central terminal, an alternative way of operating such a wireless telecommunications system is in a Demand Assignment mode, in which a larger number of STs are associated with the central terminal than the number of traffic-bearing orthogonal channels available to handle wireless links with those STs, the exact number supported depending on the level of dial tone service that the service provider desires. These orthogonal channels are then assigned to particular STs on demand as needed. This approach means that far more STs can be supported by a single central terminal than is possible in a fixed assignment mode, the exact number supported depending on the level of dial tone service that the service provider desires. In preferred embodiments of the present invention, each subscriber terminal 20 is provided with a demand-based access to its central terminal 10, so that the number of subscribers which can be serviced exceeds the number of available wireless links.

However, the use of a Demand Assignment mode complicates the interface between the central terminal and the switch of the PSTN. On the switch side interface, the CT must provide services to the switch as though all of the subscribers are connected with direct service even though they may not be actually acquired to a radio frequency channel. Regardless of whether the ST is acquired or not to the switch, all of the subscribers must have a presence at the interface to the switch. Without some form of concentration, it is clear that a large number of interfaces to the switch would need to be provided. However, most PSTN switches still use unconcentrated interfaces, for example V5.1 or CAS, and only relatively few use concentrated interfaces, such as TR303 or V5.2.

To avoid each central terminal having to provide such a large number of interfaces to the switch, an Access Concentrator (AC) 100 is preferably provided between the central terminals and the switch of the PSTN, which transmits signals to, and receives signals from, the central terminal using concentrated interfaces, but maintains an unconcentrated interface to the switch, protocol conversion and mapping functions being employed within the access concentrator to convert signals from a concentrated format to an unconcentrated format, and vice versa. Accordingly, as shown in FIG. 1, the CTs 10 are connected to the AC 100 via backhaul links 13, 15 and 17, with the AC 100 then providing the connection with the PSTN 18. The backhaul links can use copper wires, optical fibres, satellites, microwaves, etc.

It will be appreciated by those skilled in the art that, although the access concentrator 100 is illustrated in FIG. 1 as a separate unit to the central terminal 10, and indeed this is the preferred implementation, it is also possible that the functions of the access concentrator could be provided within the central terminal 10 in situations where that was deemed appropriate.

For general background information on how the AC, CT and ST communicate with each other to handle calls in a Demand Assignment mode, the reader is referred to GB-A-2,326,310 and GB-A-2,326,311.

Figure 2:
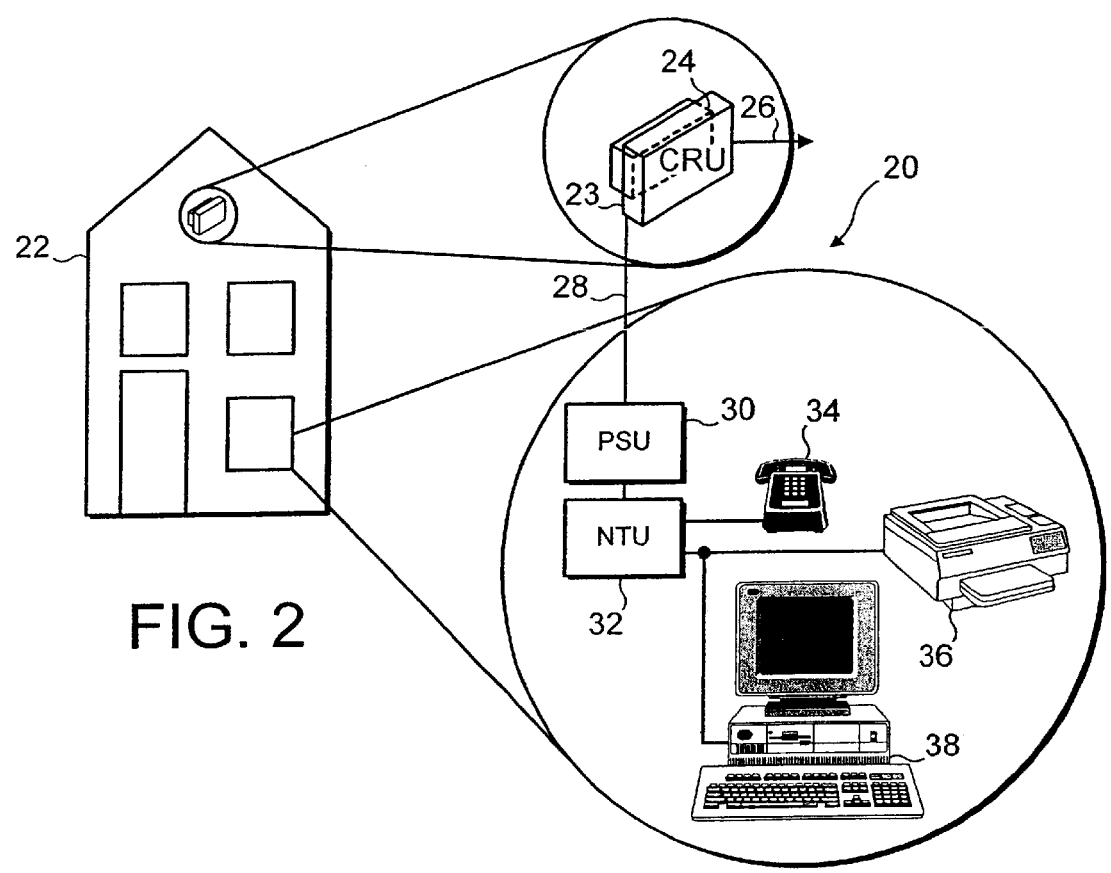
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 can support multiple lines, so that several subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3A:
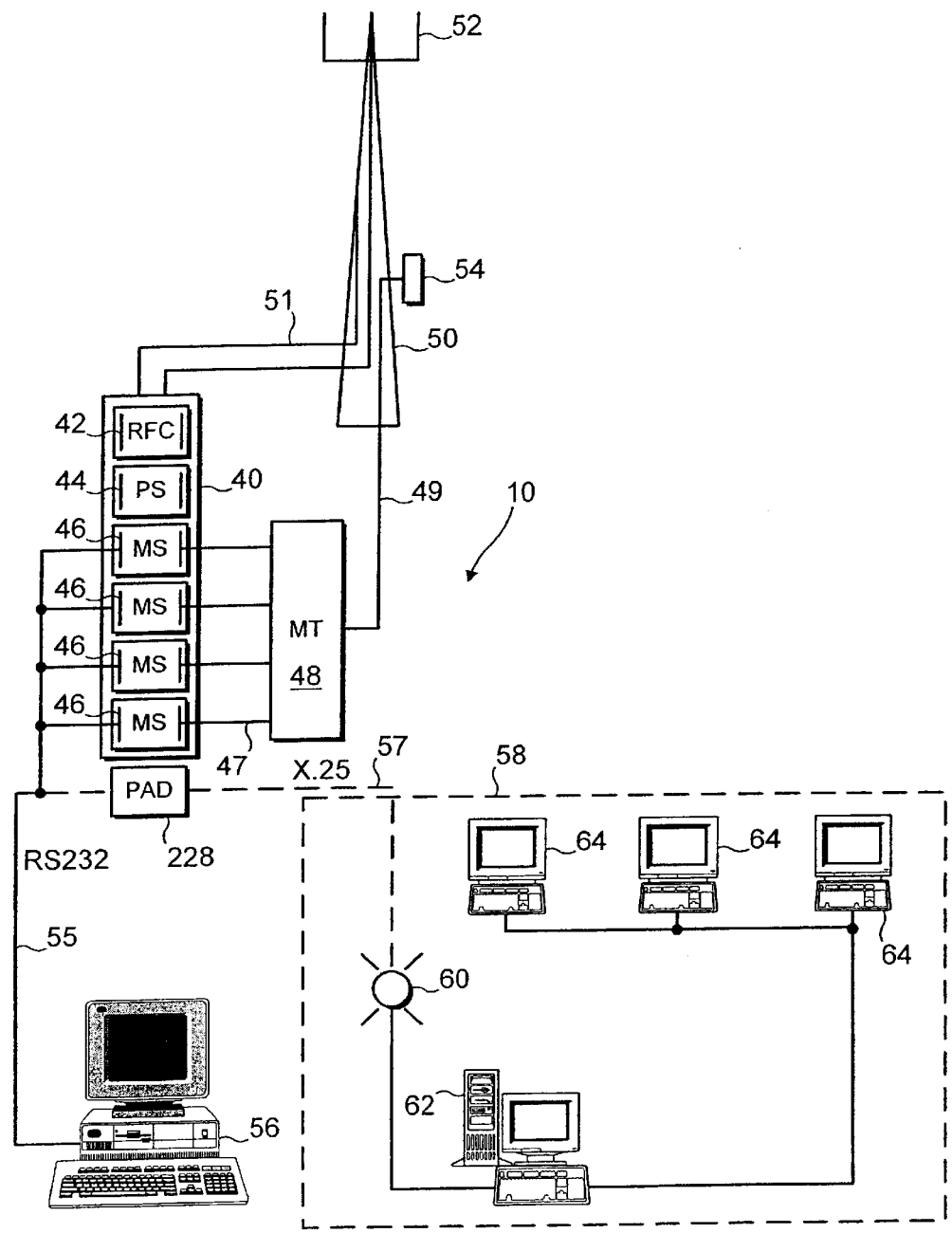
FIG. 3A is a schematic illustration of an example of a central terminal of the telecommunications system of FIG. 1.

FIG. 3A is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the modem shelves 46 to operate in parallel. If 'n' modem shelves are provided, then the RF combiner shelf 42 combines and amplifies the power of 'n' transmit signals, each transmit signal being from a respective one of the 'n' modem shelves, and amplifies and splits received signals 'n' way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, such as an omnidirectional antenna, mounted on a central terminal mast 50.

This example of a central terminal 10 is connected via a point-to-point microwave link to the Access Concentrator. As mentioned above, other types of connections (e.g., copper wires or optical fibres) can be used to link the central terminal 10 to the Access Concentrator. In this example the modem shelves are connected via lines 47 to a microwave terminal (MT) 48. A microwave link 49 extends from the microwave terminal 48 to a point-to-point microwave antenna 54 mounted on the mast 50 for a host connection to the Access Concentrator.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3A) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 may be based around a powerful workstation 62 and can include a number of computer terminals 64 for network engineers and control personnel.

Figure 3B:
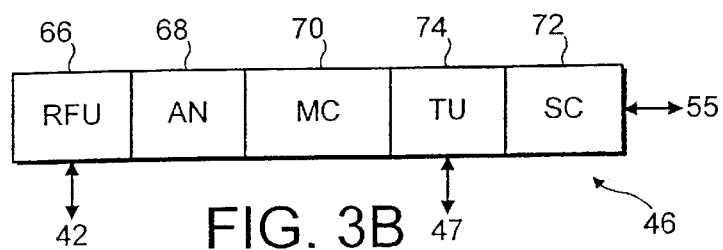
FIG. 3B is a schematic illustration of a modem shelf of a central terminal of the telecommunications system of FIG. 1.

FIG. 3B illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of the various transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This may include ½ rate convolution coding and x 16 spreading with "Code Division Multiplexed Access" (CDMA) codes on the transmit signals, and synchronisation recovery, de-spreading and error correction on the receive signals. The modem cards 70 are connected to the tributary unit (TU) 74 which terminates the connection to the Access Concentrator (e.g., via one of the lines 47) and handles the signalling of telephony information to the subscriber terminals via one of the modems. Further, each modem shelf 46 includes a shelf controller 72 that is used to manage the operation of the whole of the modem shelf and its daughter network sub-elements (NSEs). The shelf controller (SC) is provided with a RS232 serial port for connection to the site controller 56 or to the pad 228. The shelf controller communicates control and data information via a backplane asynchronous bus directly with the other elements of the modem shelf Other network sub-elements are connected via the modem cards.

The wireless telecommunications between a central terminal 10 and the subscriber terminals 20 could operate on various frequencies, and so, for example, can be arranged to support system implementation in various frequency ranges within the PCS, ITU-R and ETSI 2 GHz and 3 GHz frequency ranges. As an example, the wireless telecommunication system may operate in the Band defined by ITU-R (CCIR) Recommendation F.701 (2025–2110 MHz, 2200–2290 MHz), where 12 uplink and 12 downlink radio channels of 3.5 MHz each may be provided centred about 2155 MHz. In this example, the duplex spacing between a corresponding uplink and downlink radio channel is 175 MHz.

In the present example, each modem shelf is arranged to support 1 frequency channel (i.e. one uplink frequency plus the corresponding downlink frequency), with techniques such as 'Code Division Multiplexed Access' (CDMA) being used to enable a plurality of wireless links (or "communication channels" as they are also referred to herein) to subscriber terminals to be simultaneously supported on a plurality of orthogonal channels within each frequency channel.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10. This is discussed in more detail in GB-A-2,301,751, which also provides further details on CDMA encoding/decoding, and on the signal processing stages employed in the subscriber terminals and central terminal to manage CDMA communications between them.

The above description has provided an overview of a suitable wireless telecommunications system in which the present invention may be employed. The techniques used in preferred embodiments of the present invention to handle dialling at the ST of the wireless telecommunications system will now be discussed.

Figure 4:
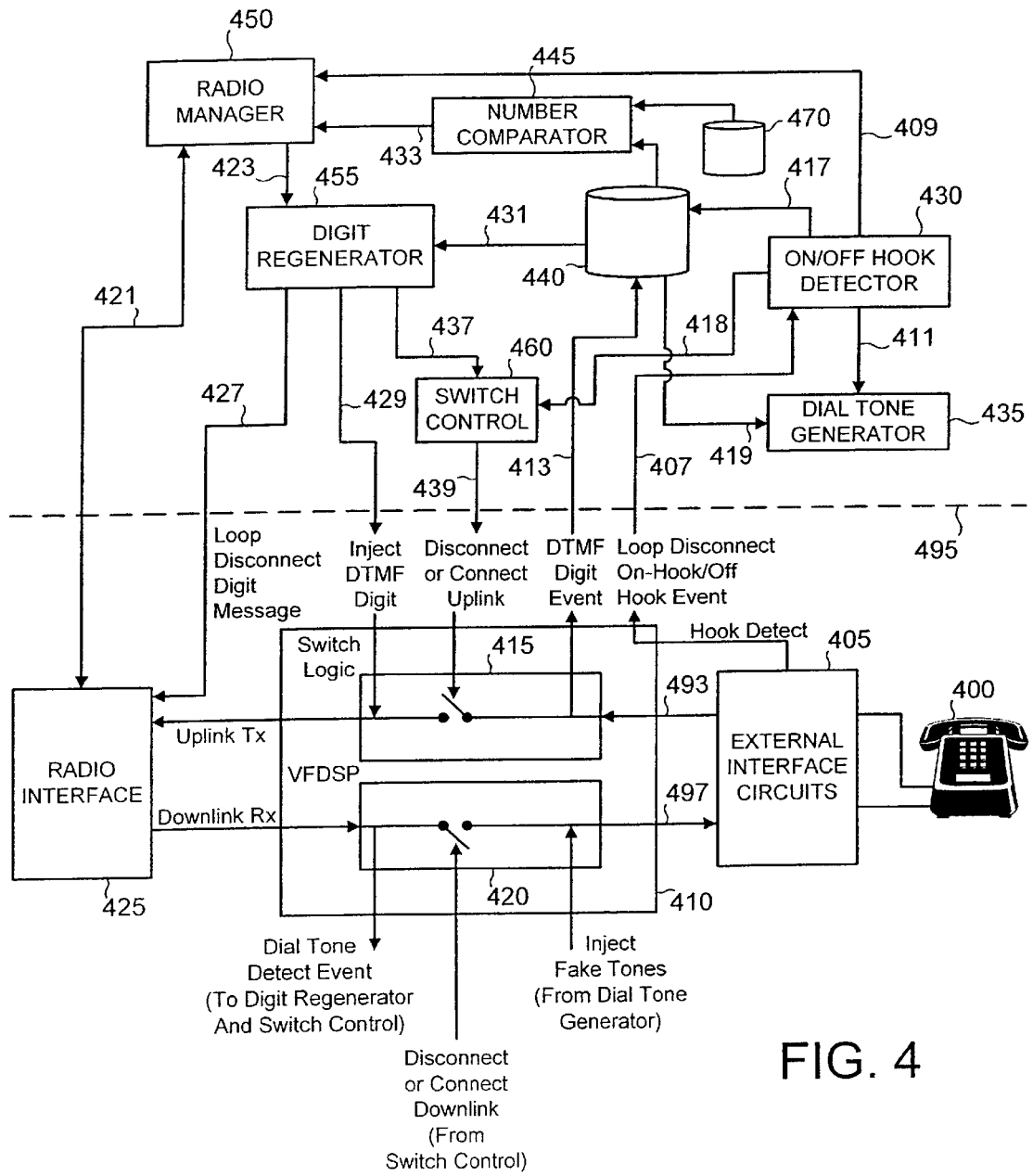
FIG. 4 is a block diagram illustrating elements provided within the subscriber terminal of preferred embodiments of the present invention to handle dialled digits.

FIG. 4 is a block diagram illustrating the elements provided within a subscriber terminal in accordance with preferred embodiments of the present invention for handling dialled digits. Within the subscriber terminal, radio interface circuitry 425 is provided for interfacing with the central terminal via the radio resource. Additionally, external interface circuits 405 are provided for interfacing the subscriber terminal with the one or more items of telecommunications equipment 400 connected to that subscriber terminal. Between the radio interface circuitry 425 and the external interface circuits 405, a switching element is provided for controlling the routing of digits through the subscriber terminal. This switching element consists of switch logic 410 and a switch control function 460 for controlling the connection and disconnection of the switches within the switch logic 410. The switch logic 410 consists of a switch 420 located in the downlink bearer channel, and a switch 415 located in the uplink bearer channel, along with certain software running on a processor to handle functions such as the detection and routing of digits, the injection of DTMF digits into the uplink bearer channel, the detection of real dial tone events on the downlink bearer channel, and the injection of fake dial tones onto the downlink bearer channel. In preferred embodiments, the processor is referred to as a Voice Frequency Digital Signalling Processor (VFDSP).

When a user wishes to make an outgoing call, the user will cause the item of telecommunications equipment to enter an off-hook state. For example if the item of telecommunication equipment is a telephone set, the user may lift up the handset to cause the item of telecommunications equipment to enter an off-hook state. This will cause a signal to be issued from the item of telecommunications equipment to the subscriber terminal, where it is routed via the external interface circuits 405 and the switch logic 410 to an on/off hook detector function 430. On detecting the off-hook state, the on/off hook detector 430 will issue a signal to the dial tone generator 435 over path 411, and another signal to the radio manager 450 over path 409.

The dial tone generator 435 will then issue a fake dial tone to the switch logic 410, which will then route that fake dial tone over the downlink communications path 497 to the external interface circuits 405, and from there to the item of telecommunications equipment 400.

At the same time, the radio manager 450 will respond to the signal received over path 409 by seeking acquisition of a link for the call, including acquisition of a communication channel of the radio resource connecting the subscriber terminal with the central terminal.

As shown in FIG. 4, the initial state of the switches 415 and 420 is that both switches are disconnected, and therefore the item of telecommunications equipment 400 cannot communicate with the radio interface 425, or receive any signals from the radio interface. However, upon receipt of the fake dial tone, the user of the item of telecommunications equipment 400 may begin dialling digits for the telephone number being dialled. In the event that the user dials any tone dialled digits prior to the link being acquired, those tone dialled digits (or DTMF digits as they are also referred to herein) are routed over path 413 to the storage 440. Similarly, if the digits are loop disconnect dialled digits (or LD digits as they are also referred to herein) such LD digits are routed by the external interface circuits 405 via the switch logic 410 to the on/off hook detector 430 over path 407. The on/off hook detector 430 is then arranged to pass those LD digits to the storage 440 over path 417. Once the first digit is stored in the storage 440, a signal is passed over path 419 to the dial tone generator 435 to cause the fake dial tone to be turned off.

This state of affairs continues until such time as the radio manager 450 has obtained a link, or it has been determined that no link is available. In the event that no free communication channels are available for a predetermined period, then a blocking tone (call failure) is generated locally within the subscriber terminal and provided to the item of telecommunications equipment 400. On receipt of the blocking tone, the user will need to put the item of telecommunications equipment back into the on-hook state, and then retry the procedure again.

However, assuming a link is acquired, then once that link has been acquired, any buffered digits in the storage 440 will need to be regenerated. In preferred embodiments, when the link is acquired, a real dial tone will be generated by the exchange. The switch logic 410 is arranged to detect this real dial tone on the downlink communication path, and to issue a signal to the digit regenerator 455 to then initiate regeneration of any digits in the storage 440.

In an alternative embodiment, rather than initiating regeneration of the digits based on dial tone detection, such regeneration of digits can be triggered upon radio activation, as indicated by a signal issued from the radio manager 450 to the digit regenerator 455 over path 423. This may, for example, be used in emergency telephone implementations, where a true dial tone may not be generated by the exchange.

The digit regenerator 455 will retrieve each digit from the storage 440 one digit at a time over path 431, and will then regenerate that digit to the exchange. For DTMF digits, the digit regenerator will reconstruct those digits and send them via path 429 to switch logic 410, where they will be sent "in-band" in the uplink bearer channel to the radio interface 425 and from there to the exchange via the central terminal. For LD digits, the digit regenerator 455 will generate a LD digit message to represent each digit, and will send those messages via path 427 to the radio interface 425, where they will be transmitted over a signalling communication channel to the central terminal, and from there onto the interface between the wireless telecommunications system and the exchange. The interface will then regenerate the LD dialled digits towards the exchange, for example using a message-based protocol (V5.1/V5.2) or CAS depending on the exchange type.

After the regeneration of each digit (whether an LD digit or a DTMF digit), a preprogrammed delay (inter-digit pause) occurs before the next digit is regenerated by the digit regenerator 455. This inter-digit pause is in preferred embodiments a minimum pause required between each digit in order to enable those digits to be identified individually by the exchange. Using this approach, the digit stream is recreated as if the user had been dialling the buffered digits directly.

After transmission of the first digit, and its receipt by the exchange, the real dial tone will be turned off by the exchange, and the turning off of this dial tone is detected by the switch logic 410 over the downlink communication path. Upon detection of the turning off of the real dial tone, a signal is sent from the switch logic 410 to the switch control 460, causing the switch control to issue a signal over path 439 to the switch 420 to connect the downlink bearer channel from the exchange through to the item of telecommunications equipment 400. This enables any in-band tones generated by the exchange, or speech provided by the remote party, following turning off of the real dial tone to be passed through to the subscriber terminal, and from there to the item of telecommunications equipment 400.

Whilst digits are being regenerated by the digit regenerator 455, the switch 415 is arranged to continue to keep the uplink communication channel disconnected from the item of telecommunications equipment, and accordingly any further digits dialled by the user continue to be routed to the storage 440. However, at some point, the digit regenerator 455 will catch up with the digits being dialled by the user, and so will reach a point where there are no further buffered digits in the storage 440. At this point, following the last inter-digit pause, the digit regenerator 455 issues a signal to the switch control 460 over path 437, to cause the switch control 460 to issue a signal to the switch 415 over path 439 to connect the uplink communication channel to the item of telecommunications equipment.

Once the uplink bearer channel towards the exchange has been connected, the user can begin speaking. In addition, any further dialled digits are no longer buffered in the storage 440, but instead are passed straight through to the radio interface for forwarding onto the exchange. Hence DTMF digits are passed in-band over the uplink communication channel, whilst LD digits continue to be sent one digit at a time within an LD digit message, with the exception that the inter-digit pause is now a function of the user's item of telecommunications equipment.

It should be noted that the above approach for dealing with dialled digits ensures that should mixed dialling be encountered (LD following by DTMF or DTMF followed by LD), the digit stream as received by the exchange is as dialled by the user.

Once the call has ended, the on/off hook detector 430 will detect the on-hook event, and will then issue a signal over path 418 to the switch control 460 to cause both switches 415 and 420 to be disconnected.

A further feature provided in preferred embodiments of the present invention is the provision of a number comparator 445 to facilitate identification of priority numbers, for example emergency numbers, or other high priority numbers. Accordingly, in preferred embodiments, a number of priority numbers may be stored within a storage 470, such telephone numbers normally being set by the management system (eg. the element manager 58 or site controller 56 of FIG. 3A) when the subscriber terminal is commissioned. The priority telephone numbers can be different for each subscriber terminal, and indeed can be different for each line supported by the subscriber terminal.

Each time a new digit is stored within the storage 440, the number comparator 445 is arranged to compare the number represented by the digits stored within the storage 440 with the predetermined priority numbers stored in the storage 470. If a match is determined, the number comparator is then arranged to issue a signal overpath 433 to the radio manager 450 to indicate that a priority number is being dialled.

If at this point the radio manager 450 has not yet been able to acquire a communication channel over the radio resource, it is arranged to issue a signal to the central terminal over the radio interface 425 to request access to a priority radio channel. A priority radio channel is a radio channel reserved for the exclusive use of a subscriber terminal setting up an outgoing call, where the call has been identified as having a priority destination. The central terminal is preferably arranged to transmit to subscriber terminals the available priority radio channel information on a call control channel within a Priority Channel Freelist message. Central terminal software is arranged to ensure that a predetermined number of priority channels are maintained within the Priority Channel Freelist, and the number of channels to be allocated as priority channels is typically set by the management system.

To maintain the required number of priority channels, it may be necessary for a subscriber terminal with active calls to be forced off the radio to free a radio channel to be used as a priority channel. In preferred embodiments, a subscriber terminal with active calls where none of them are priority calls can be forced off the radio if required to free up that radio channel for use as a priority radio channel. However, in preferred embodiments, a subscriber terminal with active calls where at least one of the calls is a priority call will not be forced off the radio. It is possible that a situation may occur where all of the available communication channels are in use for priority calls, and in this event any new priority call attempt will be blocked. In the event that a priority call is blocked, the subscriber terminal will continue to attempt to obtain a communication channel on the radio resource until the user hangs up.

Hence, it can be seen that if a match signal is received over path 433, and a communication channel has not yet been acquired by the radio manager 450, then the radio manager 450 will typically be able to obtain a priority channel for allocation to that call, and thus quickly obtain a communication channel.

If at the time the match signal is issued over path 433, a communication channel has already been obtained by the radio manager 450, then the radio manager 450 will issue a signal to the central terminal to cause the acquired communication channel to be allocated as a priority communication channel for the duration of the call. This will then avoid the possibility that the call may be forced off the radio in the event of a subsequent priority call.

Another feature provided in preferred embodiments is a possibility to set up a subscriber terminal so that it always has priority access. Using priority access always mode will allow all calls from that subscriber terminal to be processed as priority calls, simply by going off-hook. There is therefore no restriction on the number dialled, and instead any network number can be called. This will provide the network operator with additional services, for example selling/having priority access as a premium service, direct connection to an operator (without dialling), use in motorway emergency phone service, taxi hotlines (as found at airports and railway stations), etc.

For incoming calls, the circuitry of FIG. 4 can be arranged to enable incoming calls to be handled in the standard manner. The switch logic 410 will detect the ring tone on the downlink communication channel, and will issue a signal to the switch control 460 to cause both the switches 415 and 420 to be connected to set the downlink and uplink bearer channels so that they are connected between the exchange and the item of telecommunications equipment 400. Hence, the incoming call can then be handled in a standard manner.

It should also be noted that the subscriber terminal of preferred embodiments can still be set to support the standard prior art dialling approach, where the user can only begin dialling numbers once the real dial tone is obtained. In that mode of operation, the switches 415 and 420 are connected such that the downlink and uplink bearer channels are connected in both to and from the exchange. When the item of telecommunications equipment 400 enters an off-hook state, the user must wait for the true dial tone from the exchange before dialling. Any digits dialled before this will be lost. All DTMF digits are passed to the exchange within the bearer channel to the exchange, and if desired the DTMF digits can also be captured for monitoring and management purposes. However, any captured DTMF digits are not used in signalling. All LD digits are captured for signalling, monitoring and management purposes. All LD digits are sent as LD digit messages over the radio to the central terminal, and forwarded on to the interface to the exchange. The interface will then regenerate the LD digit messages towards the exchange in the standard manner.

With reference again to FIG. 4, in preferred embodiments, all of the functions above the dotted line 495 are in preferred embodiments executed on a separate processor to the VFDSP, and in preferred embodiments are implemented by software routines executing on such a processor. However, it will be appreciated that, if desired, all of the functionality could be provided on a single processor.

Figure 5:
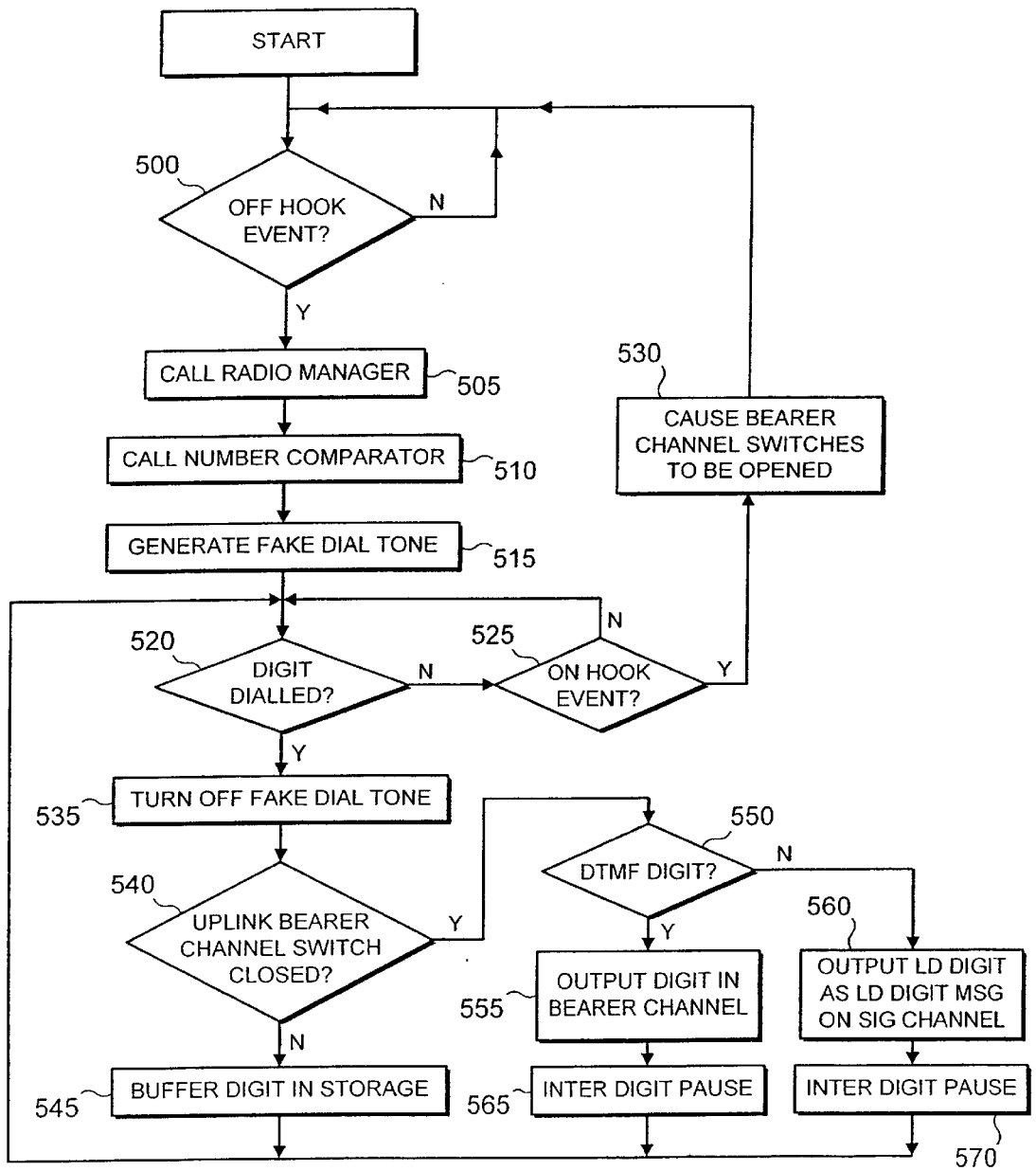
FIGS. 5 to 8 are flow diagrams illustrating the process performed within the subscriber terminal in accordance with preferred embodiments of the present invention in order to handle dialled digits.

Having discussed the structure of the subscriber terminal of preferred embodiments with reference to FIG. 4, the process performed in preferred embodiments to handle dialled digits will be further discussed with reference to the flow diagrams of FIGS. 5 to 8. The main execution loop is illustrated in FIG. 5. At step 500, it is determined whether an off-hook event has been detected. Once an off-hook event has been detected, the radio manager is called at step 505, the call number comparator is called at step 510, and a fake dial tone is generated at step 515. Preferably, the functions called at steps 505 and 510 then execute in parallel. The function of the radio manager will be discussed later with reference to FIG. 6, whilst the function of the number comparator will be discussed later with reference to FIG. 8.

Once the fake dial tone has been generated at step 515, the processor then determines at step 520 whether any digit has been dialled. If not, it is determined whether an on-hook event has been detected (i.e. an end of call) and assuming not the process then returns to step 520.

Once a digit has been detected at step 520, the fake dial tone is turned off at step 535, and at step 540 it is determined whether the uplink bearer channel switch is closed. With reference back to FIG. 4, it will be appreciated that the uplink bearer channel switch will not have been closed until the link for the call has been acquired, and any buffered digits have been regenerated. Hence, assuming the uplink bearer channel switch is not closed, the digit is buffered in the storage at step 545, and the process then returns to step 520.

If at some point a digit is dialled, and the uplink bearer channel switch is closed, then the process will branch from step 540 to step 550, where it will be determined whether the digit is a DTMF digit. If it is, then the digit will be output in the bearer channel at step 555, after which an inter digit pause will be inserted at step 565. The process will then return to step 520. If at step 550, it is determined that the digit is not a DTMF digit, i.e. it is an LD digit, then the process branches to step 560, where the LD digit is output as an LD digit message over the signalling channel, and again an inter digit pause will then be inserted at step 570. It should be noted that the inter digit pause inserted after an LD digit message will generally be different to the pause inserted after a DTMF digit, due to the different protocols being used. After the inter digit pause has been inserted the process again returns to step 520.

At some point the call will end, in which event the on hook event will be detected at step 525, causing the process to branch to step 530, where both the uplink and downlink bearer channel switches will then be opened. After step 530, the process then returns to step 500 to await detection of an off-hook event.

Figure 6:
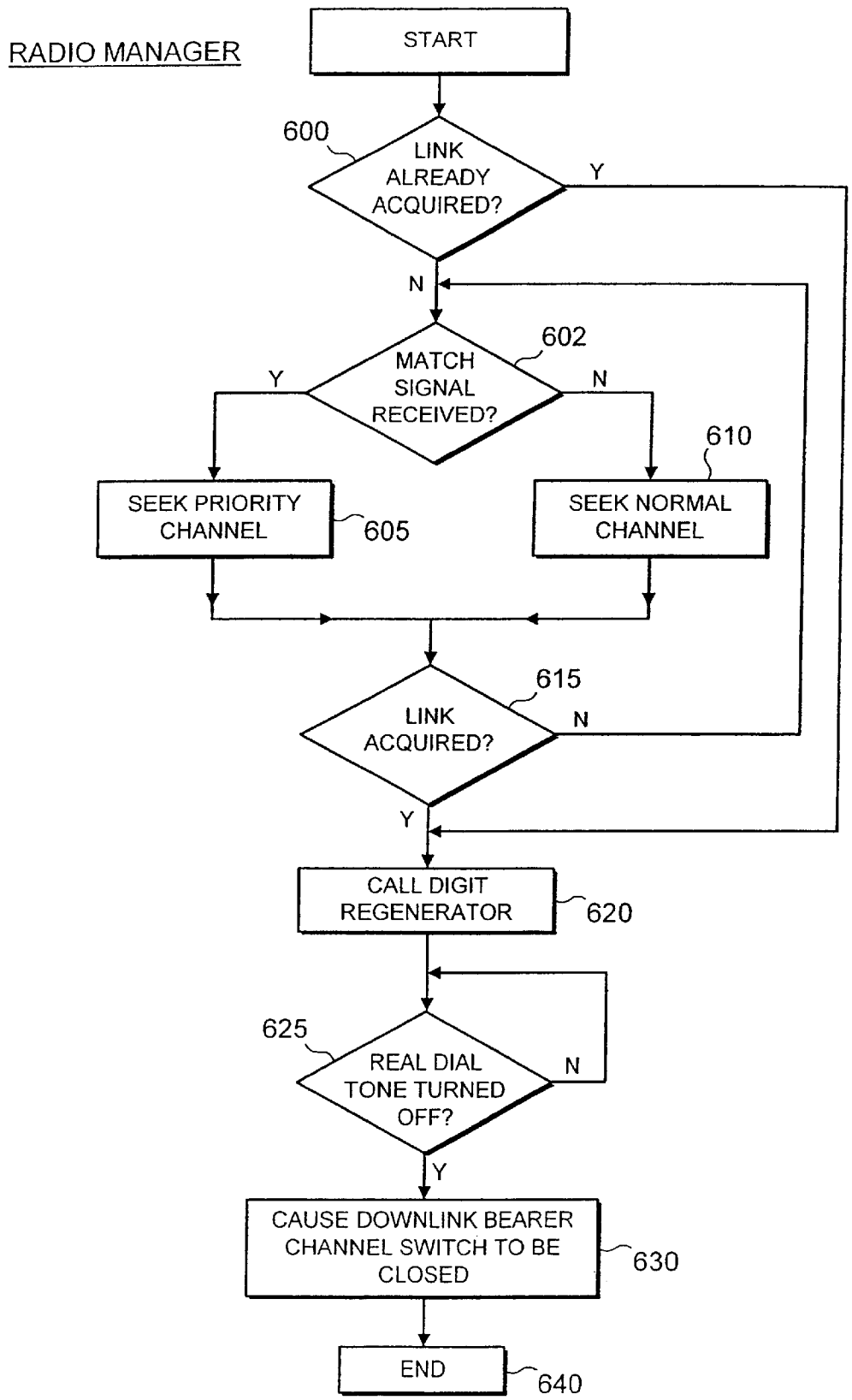
Figure 7:
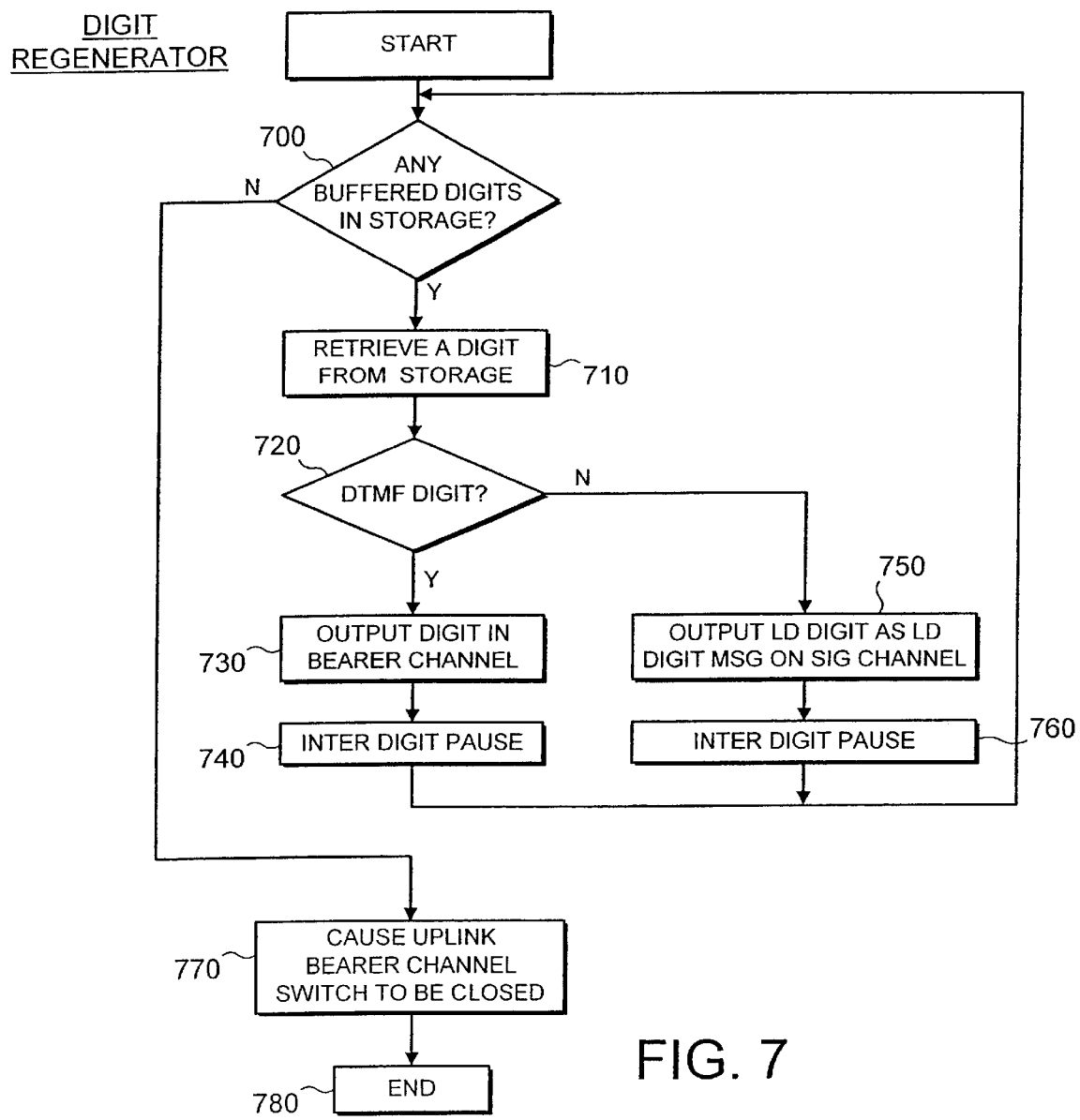

Looking now at FIG. 6, the process performed by the radio manager when called at step 505 will now be discussed. At step 600, it is determined if a link has already been acquired which may be used for the call (for example, if the subscriber terminal is already making another call on a communication channel, and sufficient bandwidth remains to also handle the new call on that communication channel), and if so the process branches straight to step 620. Otherwise the proceeds to step 602, where the radio manager determines whether a match signal has been received from the number comparator 445. If it has, then the radio manager will seek a priority channel at step 605, whereas in the absence of a match signal, the radio manager will seek a normal channel at step 610.

At step 615, it will be determined whether the link has been acquired, and if not the process will return to step 602. Once the link has been acquired, the process will proceed from step 615 to step 620, where the digit regenerator will be called. The process employed by the digit regenerator will now be discussed with reference to FIG. 7.

At step 700, the digit regenerator determines whether there are any buffered digits in the storage. Assuming there are, the process will proceed to step 710, where the next digit will be retrieved from the storage (preferably the storage will operate in a first-in-first-out (FIFO) manner), and then at step 720 it will be determined whether that digit is a DTMF digit. Assuming it is a DTMF digit, the digit will be output in the uplink bearer channel to the exchange at step 730, after which an inter digit pause will be inserted at step 740. In the event that the digit is an LD digit, the process will branch from step 720 to step 750, where the LD digit will be output as an LD digit message on the signalling channel, and again an inter digit pause will then be inserted at step 760. Once the inter digit pause has been inserted, the process will return to step 700 to determine whether there are any further buffered digits in the storage.

At some point, the digit regenerator will determine that there are no more buffered digits in the storage, at which point the process will branch to step 770, where the uplink bearer channel switch 415 will be caused to be closed. At this point, the process performed by the digit regenerator is deemed to be terminated.

Returning to FIG. 6, once the digit regenerator has been called at step 620, the process proceeds to step 625, where it is determined whether the real dial tone has been turned off. As mentioned earlier this will occur once the first digit has been received by the exchange, and once the real dial tone has been turned off, and detected by the subscriber terminal, the process will proceed to step 630, where the downlink bearer channel switch is closed. The process performed by the radio manager then terminates at step 640.

Figure 8:
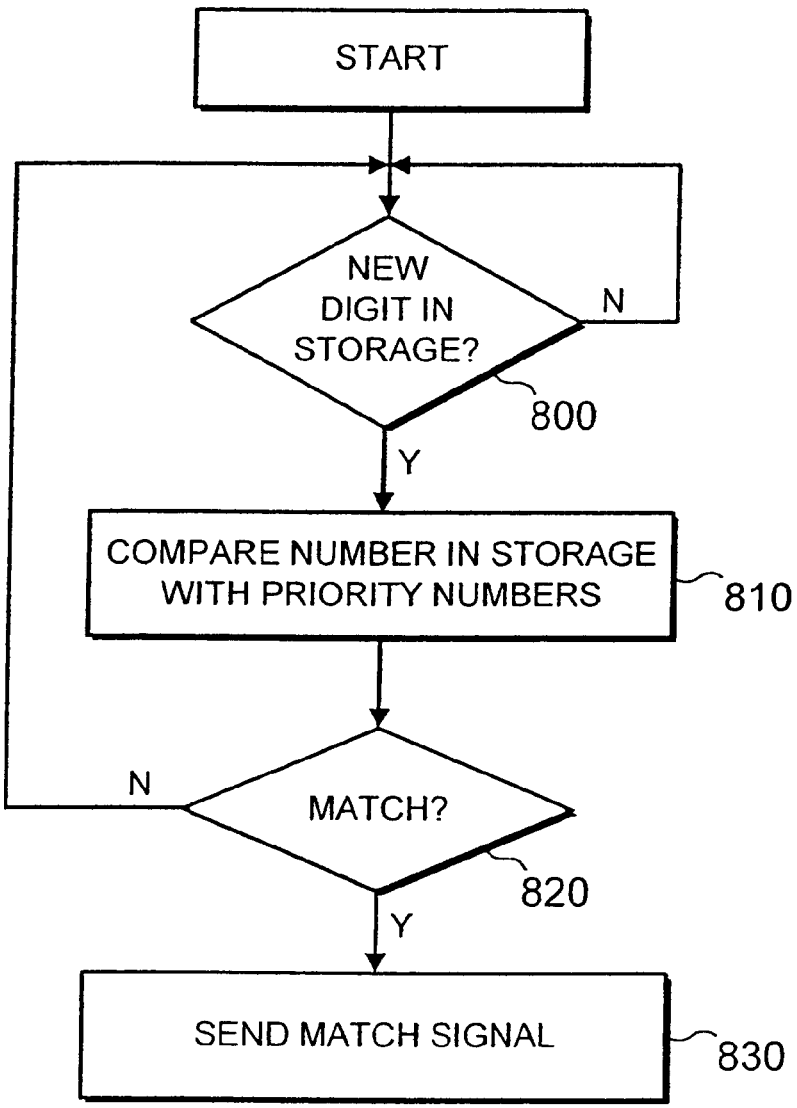

FIG. 8 illustrates the process performed by the number comparator once called at step 510 of FIG. 5. At step 800, the number comparator determines whether a new digit has been stored in the storage 440. Once a new digit has been detected, the process proceeds to step 810, where the total string of digits stored in the storage is then compared with the predetermined priority numbers in the storage 470. At step 820, it is determined whether a match has been detected, and if not the process returns to step 800. However, assuming a match is detected, then the process proceeds to step 830, where a match signal is issued to the radio manager. Referring back to FIG. 6, the detection of that match signal then takes place at step 600.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A digit handling system for a subscriber terminal of a wireless telecommunications system, the subscriber terminal being arranged to have an item of telecommunications equipment connected thereto and being connectable to a central terminal of the wireless telecommunications system via a radio resource to enable a call to be routed between the item of telecommunications equipment and an exchange coupled to the central terminal, the digit handling system comprising:

a detector for detecting when the item of telecommunications equipment enters an off-hook state;

a dial tone generator for generating a fake dial tone to the item of telecommunications equipment upon detection of the off-hook state;

a radio manager, responsive to detection of the off-hook state, for seeking acquisition of a communication channel of the radio resource over which to pass call data;

a switching element for controlling the routing of digits through the subscriber terminal, the switching element being arranged to pass to a storage digits received from the item of telecommunications equipment following the detection of the off-hook state;

a digit regenerator, responsive to an indication that the communication channel has been acquired, for regenerating each digit stored in the storage and outputting the regenerated digits over the radio resource to the central terminal;

the switching element being arranged, upon determination that the storage contains no further digits, to route any further digits received from the item of telecommunications equipment for output over the radio resource to the central terminal without being stored in the storage; and a number comparator arranged to compare, as each digit is stored in the storage, the number represented by the stored digits with one or more selected numbers, and to issue a match signal to the radio manager if the stored digits match any of the selected numbers, wherein upon receipt of the match signal, the radio manager is arranged to seek acquisition of a reserved communication channel for the call if the communication channel has not yet been acquired.

2. A digit handling system as claimed in claim 1, wherein the digits are tone dialled digits, and the digit regenerator outputs the regenerated digits over the communication channel acquired by the radio manager with a predetermined delay between each regenerated digit.

3. A digit handling system as claimed in claim 1, wherein the digits are loop disconnect dialled digits, and the digit regenerator regenerates each stored digit as a digit message and outputs each digit message over a signalling communication channel of the radio resource, with a predetermined delay between each digit message.

4. A digit handling system as claimed in claim 1, wherein the selected numbers are priority telephone numbers and the reserved communication channel is one of a number of priority channels reserved by the wireless telecommunications system for the handling of priority calls to said priority telephone numbers.

5. A digit handling system as claimed in claim 1, wherein upon receipt of the match signal, if the communication channel has already been acquired, the radio manager is arranged to identify that that communication channel should be treated as a reserved communication channel for the duration of the call.

6. A digit handling system as claimed in claim 1, wherein the communication channel acquired by the radio manager comprises a downlink communication channel from the central terminal to the subscriber terminal and an uplink communication channel from the subscriber terminal to the central terminal, the switching element being able to independently control the connection of the item of telecommunication equipment to the downlink and uplink communication channels.

7. A digit handling system as claimed in claim 6 wherein the digit regenerator is arranged to be responsive to detection of a real dial tone signal from the exchange to begin regenerating digits, the exchange being arranged to turn off the real dial tone upon receipt of the first regenerated digit, the switching element being responsive to detection that the real dial tone has been turned off to connect the downlink communication channel to the item of telecommunications equipment.

8. A digit handling system as claimed in claim 6, wherein the switching element is arranged, once the last digit in the storage has been regenerated and the predetermined delay following output of that last digit has expired, to connect the uplink communication channel to the item of telecommunications equipment, after which the switching element is arranged to ensure that no further dialled digits are routed to the storage.

9. A subscriber terminal for a wireless telecommunications system, the subscriber terminal being arranged to have an item of telecommunications equipment connected thereto and being connectable to a central terminal of the wireless telecommunications system via a radio resource to enable a call to be routed between the item of telecommunications equipment and an exchange coupled to the central terminal, the subscriber terminal comprising a digit handling system as claimed in any preceding claim.

10. A method of handling dialled digits in a subscriber terminal of a wireless telecommunications system, the subscriber terminal being arranged to have an item of telecommunications equipment connected thereto and being connectable to a central terminal of the wireless telecommunications system via a radio resource to enable a call to be routed between the item of telecommunications equipment and an exchange coupled to the central terminal, the method comprising the steps of:

detecting when the item of telecommunications equipment enters an off hook state;

generating a fake dial tone to the item of telecommunications equipment upon detection of the off-hook state;

responsive to detection of the off-hook state, seeking acquisition of a communication channel of the radio resource over which to pass call data;

controlling a switching element to pass to a storage digits received from the item of telecommunications equipment following the detection of the off-hook state;

responsive to an indication that the communication channel has been acquired, regenerating each digit stored in the storage and outputting the regenerated digits over the radio resource to the central terminal;

upon determination that the storage contains no further digits, controlling the switching element to route any further digits received from the item of telecommunications equipment for output over the radio resource to the central terminal without being stored in the storage:

as each digit is stored on the storage, comparing the number represented by the stored digits with one or more selected numbers, and issuing a match signal if the stored digits match any of the selected numbers;

wherein in the presence of said match signal, said step of seeking acquisition comprises seeking acquisition of a reserved communication channel for the call if the communication channel has not yet been acquired.

11. A computer program operable to configure a subscriber terminal of a wireless telecommunications system to perform a method as claimed in claim 10.

12. A carrier medium comprising a computer program as claimed in claim 11.

* * * * *